United States Patent [19]

Heiligtag

[11] 4,231,874
[45] Nov. 4, 1980

[54] GYRATORY AEROBIC AERATION TREATMENT TANK

[76] Inventor: Raymond W. Heiligtag, Rte. 4, Box 180, Imperial, Mo. 63052

[21] Appl. No.: 750,395

[22] Filed: Dec. 14, 1976

[51] Int. Cl.³ .............................. B01F 3/04; C02F 3/22
[52] U.S. Cl. ............................... 210/195.4; 210/220; 210/256; 210/258; 210/261; 261/DIG. 75
[58] Field of Search .................. 210/14, 15, 60, 63 R, 210/195 S, 220, 221 R, 256, 258, 260, 261; 261/DIG. 75

[56] References Cited

U.S. PATENT DOCUMENTS

| | | | |
|---|---|---|---|
| 2,852,140 | 9/1958 | MacLaren | 210/195 S X |
| 2,878,939 | 3/1959 | Aldrich | 210/256 X |
| 3,051,315 | 8/1962 | Boester | 210/195 S |
| 3,053,390 | 9/1962 | Wood | 210/195 S |
| 3,161,590 | 12/1964 | Weis et al. | 210/221 R |
| 3,195,727 | 7/1965 | Kibbee | 210/195 S |
| 3,234,880 | 2/1966 | Hampton | 210/195 S |
| 3,271,304 | 9/1966 | Valdespino et al. | 210/14 X |
| 3,397,789 | 8/1968 | Valdespino | 210/195 S X |
| 3,503,593 | 3/1970 | Nelson | 261/29 |
| 3,618,779 | 11/1971 | Goodman | 210/195 S |
| 3,744,634 | 7/1973 | Schlenz | 210/256 X |
| 3,744,637 | 7/1973 | Ziegler | 210/221 R X |
| 3,764,011 | 10/1973 | Owens | 210/260 X |
| 3,846,292 | 11/1974 | LeCompte, Jr. | 210/14 |
| 3,882,017 | 5/1975 | Wittrup | 210/15 |
| 3,910,838 | 10/1975 | Kaelin | 210/14 X |
| 3,997,437 | 12/1976 | Prince et al. | 210/14 X |

FOREIGN PATENT DOCUMENTS

942754 11/1963 United Kingdom ............ 261/DIG. 75

Primary Examiner—Robert H. Spitzer
Attorney, Agent, or Firm—Lionel L. Lucchesi

[57] ABSTRACT

A waste treatment tank has a cylindrical enclosure defining a chamber. A cylindrical side wall of the enclosure and a cylindrical baffle are arranged concentrically with respect to one another. The side wall and baffle divide the chamber into first and second chamber portions. Means for generating a horizontal circulatory flow pattern in the first, radially outward chamber portion is mounted within that chamber portion and includes a submersible pump means. The pump means has an inlet, an outlet and connector means between the inlet and outlet. The second radially innermost chamber portion forms a clarification section, while the first chamber portion forms the aeration section of the waste treatment tank. Inlet means are provided between the first and second chamber portions. The baffle also permits the communication between first and second chamber portions along the bottom of the baffle. Means for supplying air to the aeration tank section is operatively attached to the connector means of the pump. Skimmer means for removing floating solids from the second chamber portion also is operatively attached to the connector means of the pump. Preferably, the air supply means is adjustable to regulate the aeration process of the tank.

7 Claims, 5 Drawing Figures

U.S. Patent  Nov. 4, 1980  4,231,874
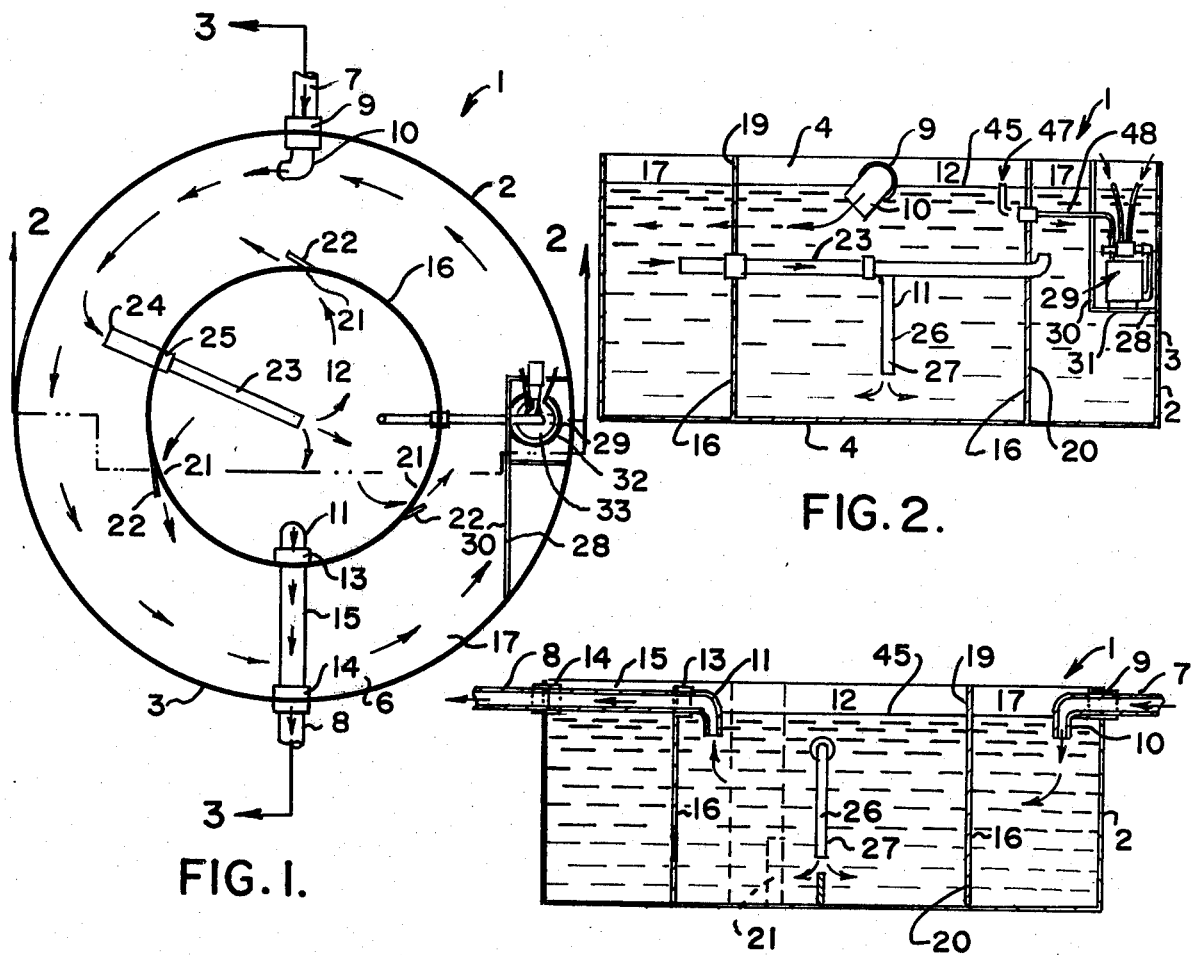
FIG. 1.
FIG. 2.
FIG. 3.
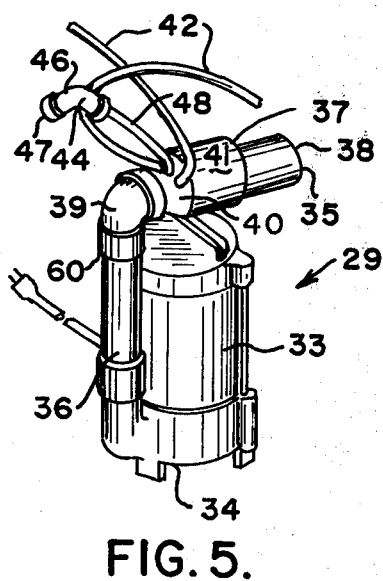
FIG. 5.
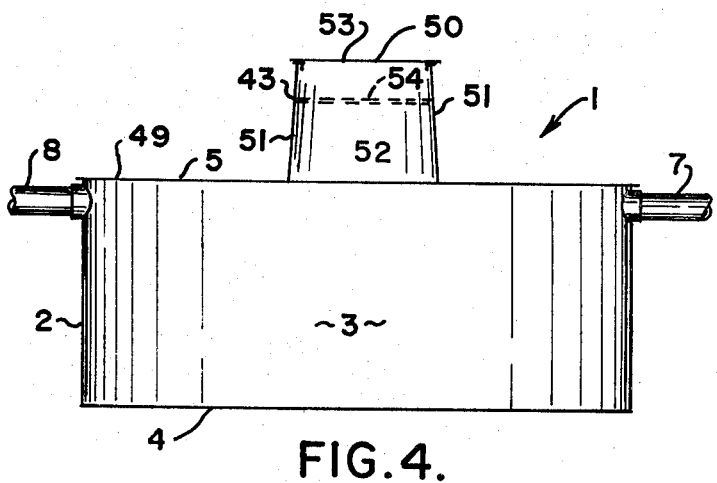
FIG. 4.

GYRATORY AEROBIC AERATION TREATMENT TANK

BACKGROUND OF THE INVENTION

This invention relates to apparatus for treating waste products and in particular, to a waste treatment tank construction adaptable to a variety of uses.

Aeration process treatment tanks are well known in the art, and their basic operational processes are given, for example, in U.S. patents to Weiss, U.S. Pat. No. 3,161,590, Kibbee, U.S. Pat. No. 3,195,727, Ziegler, U.S. Pat. No. 3,744,637, and references cited therein. In general, waste treatment tanks based on an aeration process have two tank sections, commonly known in the art as an aeration section and a clarification section. Raw sewage is introduced into the aeration tank section, where it is mixed with air. The air aids in the multiplication of bacteria which convert the raw sewage solution into a decomposed mixture. The decomposed mixture enters the clarification section, where the treated effluent leaves the tank as an unoffensive liquid.

Prior art waste treatment systems have either utilized a plurality of tank sections separated by elaborate baffle systems, or have utilized two tank sections and employed a vertical circulatory pattern in the aeration tank section, or some combination of both types. In a vertical circulatory pattern, flow in the aeration section is induced by suitable means so that the sewage mixture flows across the top liquid level of the tank, down the side of the tank, across the tank bottom, and upwardly along a suitable baffle for a clockwise vertical circulatory pattern, the tank being viewed in cross section. Of course, the flow pattern is reversed when a counterclockwise vertical circulatory pattern is employed. While these prior art devices work well for their intended purposes, I have developed a novel tank structure which utilizes a horizontal circulatory flow pattern, thereby simplifying tank construction and lowering product cost. In a horizontal circulatory flow pattern, the sewage mixture flows around the tank between at least two concentrically arranged circular walls, the tank being viewed in top plan. In addition, the means for generating the circulatory pattern in the aeration section of the tank includes a connector means employing a venturi principle both for drawing air into the aeration section, and for operating a solid skimmer means in the clarification tank section.

SUMMARY OF THE INVENTION

In accordance with this invention, generally stated, a waste treatment tank includes a cylindrical outer shell and a concentric baffle positioned radially inboard of the shell. The annular area between the shell and the baffle delimits an aeration tank section, while the area surrounded by the baffle delimits a clarification tank section for the waste treatment tank. The clarification tank section has an inlet means communicating with the aeration section. At least one opening exists along the bottom of the baffle separating the clarification and aeration tank sections. The opening functions as a return path for solid matter inadvertently entering the clarification tank section. A submersible pump generates a horizontal circulatory flow pattern in the aeration tank section. The pump includes an inlet, an outlet, and a connection portion. The connection portion has a section functioning as a venturi area. A skimmer means and an air supply means are operatively connected to the connector portion along the venturi area. The skimmer means extends between the clarification tank section and the pump means, and functions to provide a return from the clarification tank section to the aeration tank section for floating solid waste that may enter the clarification tank section. The air supply tubes are operatively connected to an air source. Preferably, the air supply tubes include means for adjusting the amount of air entering the supply tubes so that the volume of air available for use in the aeration process may be regulated.

BRIEF DESCRIPTION OF THE DRAWINGS

In the drawings, FIG. 1 is a top plan view of the waste treatment tank of my invention, the cover being removed for drawing simplicity;

FIG. 2 is a sectional view taken along the line 2—2 of FIG. 1;

FIG. 3 is a sectional view taken along the line 3—3 of FIG. 1;

FIG. 4 is a view in side elevation of one illustrative embodiment of waste treatment tank of this invention; and FIG. 5 is an enlarged view of the pump means shown in FIGS. 1 and 2.

DESCRIPTION OF THE PEFERRED EMBODIMENT

Referring now to FIG. 1, reference numeral 1 indicates one illustrative embodiment of waste treatment tank of this invention. The tank 1 includes an enclosure 2 having a generally cylindrical outer shell or wall 3, a bottom 4, and a top 5. The enclosure 2 delimits a chamber 6. An inlet 7 and an oulet 8 extend through and are positioned near the upper end of the wall 3, upper being referenced to FIG. 4. The inlet 7 and outlet 8 communicate with the chamber 6 in a conventional manner.

The inlet 7 includes a connector 9 extending through the wall 3, and an elbow 10 canted to direct incoming sewage counterclockwise, counterclockwise being referenced to FIG. 1. The outlet 8, likewise, includes an elbow 11 positioned within a clarification tank section 12 and connector portions 13 and 14 for permitting passage of a pipe 15 through a baffle 16 and wall 3, respectively. Conventionally, the inlet 7 is connected to the sanitary sewer system of a building or the like, and the outlet 8 is connected to a field system for disposing the tank effluent.

The baffle 16 is a tubular member positioned radially inboard of the cylindrical wall 3, and attached to the bottom wall 4 by any convenient method. For example, where the tank 2 is constructed from metal, conventional welding or brazing techniques work well for the attaching method. The annular area between the concentrical baffle 16 and wall 3 define an aeration tank section 17. As indicated, the inlet 7 directs incoming sewage counterclockwise within the aeration tank section 17. Baffle 16 has an upper end 19 and a lower end 20, as referenced to FIGS. 2 and 3. Baffle 16 has a plurality of openings 21 formed in it, along the lower end of the baffle 16. The openings 21 are constructed so that a tab 22 is formed from the material of the baffle 16 during construction of the openings. The tab 22 forms a protective gate at the openings 21, which prevents the mixture circulating in the aeration tank section 17 from entering the clarification tank section 12, while permitting solid material entering the clarification tank section 12 to re-enter the tank section 17, a procedure described more fully hereinafter.

A pipe 23 has a first end 24 positioned in the aeration tank section 17. The pipe 23 passes through the baffle 16 at a connector 25 and extends to the approximate center of the tank 1. An elbow 26 is attached to the pipe 23 and extends from the pipe 23 toward the bottom wall 4 of the tank 1. The counterclockwise flow in the aeration tank section 17 permits sewage to enter the pipe 23 at the end 24, while the elbow 26 directs that sewage against the bottom 4 of the tank 1. The height of the end 24 within the aeration section 17 may vary. I find it convenient, however, to place the end 24 at or above the midpoint of the height of the baffle 16, so that an inordinate amount of solid waste material does not enter the clarification tank section 12. An end 27 of the elbow 26 preferably is positioned near the bottom 4, although the exact distance from the bottom 4 has not been found to be critical, and may vary over a considerable range in embodiments of this invention. The pipe 23 defines inlet means for the clarification tank section 12.

A support means 28 is attached to the wall 3 within the aeration section 17. Support means 28 may comprise any convenient structure for the purpose of mounting a circulatory flow generating means 29 within the aeration tank section 17. In the embodiment shown in the drawings, the support means 29 includes a side member 30 and a bottom member 31, both of which are attached to the wall 3 by any convenient method. The bottom member 31 preferably has an opening 32 in it. A submersible pump 33 is mounted within the support means 28 so that an inlet 34 of the pump 33 is positioned over the opening 32. Pump 33 is conventional and may comprise any of a variety of commercially available submersible pumps. The pump is connected to a source of electrical energy, not shown, through conventional connection means, not shown.

Flow generating means 29 has an outlet 35 connected to the outlet of the pump 33 through a linking means 60. The outlet 35 of the flow generating means 29 is positioned so that it generates a counterclockwise mixture flow in the aeration tank section 17 of the particular tank 1 embodiment shown in the drawings. Linking means 60 includes a pipe 36 which is operatively connected to the pump 33, a connection means 37 and an outlet pipe 38.

The connection means 37 includes an elbow 39, a conical expander section 40 connected to the elbow 39, and an enlarged body portion 41. The outlet pipe 38 is attached to the body portion 41. A plurality of air pipes 42 are operatively connected between the conical expander portion 40 of the connection means 37, and a source of air, indicated generally by the numeral 43 in FIG. 4. The pipe 36 has an internal diameter of 1.5 inches, while the pipe 38 has an internal diameter of 3 inches. The conical expander portion 40 raises the internal diameter of the linking means 60 from the 1.5 to the 3-inch size along the expander portion 40.

A skimmer means 44 also is operatively connected between the conical expander portion 40 and a liquid level surface 45 in the clarification tank section 12. The skimmer means 44, in the embodiment illustrated, preferably includes an L-shaped member 46, having an open end 47 positioned at the surface level 45, and a pipe 48 operatively connected to the conical expander 40 of the connection means 37. The operation of the conical expander portion 40, air pipes 42 and skimmer means 44 is described in greater detail hereinafter.

The top 5 is conventional and includes a top surface 49 and a housing 50. Housing 50 includes a first pair of oppositely opposed sides 51, a second pair of oppositely opposed sides 52, and a removable cover plate 53. Preferably, the housing 50 is positioned as indicated in phantom lines in FIG. 1. When so positioned, removal of the cover plate 53 permits maintenance personnel to gain access to the major operating components of the tank 1. Access may be required because of malfunctioning of the tank 1, or to adjust the volume of air entering the tank section 17 through the air pipes 42. The housing 50 has a plurality of louvers 54 in it, which give the air pipes 42 access to the air source 43.

Operation of the tank 1 of this invention is relatively easy to understand. Sewage enters the tank 1 through the inlet 7 and is deposited in the aeration tank section 17. Operation of the flow pattern generating means 29 causes a counterclockwise horizontally arranged circulatory flow pattern to commence within the aeration section 17, that pattern being indicated by an arrow pattern 55 in FIG. 1. As previously described, the elbow 10 of the inlet 7 preferably is canted so that incoming sewage will enter the circulatory flow pattern easily. The pump 33 has its inlet located towards the bottom of the tank 1, so that it pumps both solids and liquids through the linking means 60. Passage of the mixture of liquid and solids through the expander portion 40 of the linking means 60, and consequently, past the ends of the air pipes 42, causes a pressure differential to exist between the opposed ends of the pipes 42, that end of the pipes 42 opening at the conical expander portion 40 being at the lower pressure. This pressure differential draws air through the pipes from the air source 43. The air is mixed with the sewage in the body portion 41 of the linking means 60, and thereafter enters the aeration tank section 17. The induction of air with the sewage in the linking means 60 enables the solid waste matter in the sewage to decompose in the aeration tank section 17 in a manner well known in the art.

As the sewage circulates in the aeration section 17, a portion will flow through the end 24 of the pipe 23, into the clarification tank section 12. Preferably, only liquid enters the clarification section 12 through the pipe 23. In actuality, of course, both liquid and solids enter the clarification tank section 12. The particular construction utilized for the pipe 23 previously described directs all sewage entering the clarification tank section 12 against the bottom 4 of the tank 1.

Solid matter that enters the clarification tank section is drawn back into the aeration section 17 through the openings 21 in the baffle 16. The circulation pattern in the aeration section 17 is such that flow past the openings 21 creates a pressure drop at the openings 21, which tends to draw solids in the clarification tank section 12 back into the aeration tank section 17 through the openings 21. The tabs 22 act as protection gates which enable the solid sewage in the clarification tank section 12 to re-enter the aeration tank section 17 easily.

As is known in the art, the solid particles in the tank 1 sometimes rise toward the top of the tank 1. When these particles enter the clarification tank section 12, they rise to the surface or discharge level 45. Skimmer means 44 functions to remove the floating type of solid material from the clarification tank section 12. As indicated, the skimmer means 44 is operatively connected to the expansion portion 40 of the linking means 60. Again, the rapid fluid flow from past that end of the pipe 48 in the expansion portion 40 induces a pressure drop between it and the end 47. That pressure drop draws floating solids present in the clarification tank section 12 back into the aeration tank section 17.

A particular feature of the tank 1 of my invention is use of the air pipe 42 plurality of supply air to the aeration tank section 17. After tank installation, the color of the fluid and solid mixture in the tank 1 may be observed. When tank operation appears improper, then the volume of air entering the aeration tank section 17 may be regulated in a simple manner through use of the pipes 42. That is to say, air flow through the pipe 42 may be reduced by suitable means to balance tank operation with the demands placed on the tank 1. For example, one or more of the pipes 42 may be blocked to lower the air volume entering the tank 1. Thereafter, the tank 1 may be checked periodically to ensure that air supply is proper for tank operation. Of course, more complicated types of air control means may be used, if desired.

From the foregoing, it is thus apparent that the invention meets all the ends and objects herein set forth above.

Numerous variations, within the scope of the appended claims, will be apparent to those skilled in the art in light of the foregoing description and accompanying drawings. Thus, the relative position of various components of the tank 1 may be varied in other embodiments of this invention. The design silhouette of the tank 1 may be changed. For example, the tank height may be raised to eliminate the use of the housing 50, the increased height and the top 5 serving the same function as the housing 50. Design of the baffle 16 may be varied. Thus, the baffle 16 may assume the shape of a conic section in other embodiments of this invention, for example. The number of pipes 23 passing through the baffle 16 may vary, as may the number and location of flow generating means 29. While counterclockwise, horizontal circulatory flow was described, obviously the direction of flow may be reversed, if desired. The heights and locations of various inlets, outlets and other pipes utilized in connection with the tank 1 may be varied. Likewise, materials other than those described as preferred may be utilized. Although the expanding portion 40 was described as conical, other shapes are compatible with the broader aspects of this invention. These variations are merely illustrative.

Having thus described the invention, what is claimed and desired to be secured by Letters Patent of the Unites States is:

1. A self-contained waste treatment tank, which comprises:
   a cylindrical outer shell, said shell having a bottom wall a cylindrical side wall, and a top wall, said outer shell delimiting a chamber;
   a cylindrical baffle mounted in said chamber, said cylindrical baffle dividing said chamber into a first chamber part and a second chamber part, said cylindrical baffle having a lower end attached along the bottom wall of said outer shell and an upper end extending above a liquid level in said chamber, said cylindrical baffle having at least one opening permitting communication between said first and said second chamber parts along the lower end of said baffle;
   sewage inlet means communicating with said first chamber part;
   inlet means in said cylindrical baffle communicating with said first chamber part and said second chamber part, said inlet means being positioned below the liquid level in said chamber;
   outlet means communicating with said second chamber part and a point external of said outer shell; and
   means for generating a horizontal circulatory flow pattern in said first chamber, said flow pattern generating means comprising a pump submerged in sad first chamber part, said pump having an inlet positioned toward the bottom of said first chamber part and an outlet, and linkage means connected to the outlet of said pump, said linkage means including a first pipe operatively connected to said pump, connection means connected to a second end of said first pipe, and a second pipe operatively connected to said connection means, said first pipe having a first internal diameter, said second pipe having a second internal diameter, said second internal diameter being larger than the internal diameter of said first pipe, said connection means including an expanding part for expanding the diameter of said linkage means from said first diameter to said second diameter, said second pipe having an outlet in and below the fluid level in said first chamber part, said horizontal circulatory flow pattern generating means creating a flow pattern in said first chamber part which directs fluid from said first chamber part to said second chamber part through said inlet means and which simultaneously draws fluid from said second chamber part to said first chamber part along the opening in the lower end of said cylindrical baffle.

2. The waste treatment tank of claim 1 further characterized by skimmer means operatively connected between the second chamber portion of said waste treatment tank and the expanding part of the connection means of said flow pattern generating means, said skimmer means including a member having an opening through it, said member having a first end opening near the liquid level of said second chamber portion, and a second end opening along the expanding part of said linkage of said connection means, passage of said fluid through said expanding means including a differential pressure between the ends of said skimmer means.

3. The waste treatment tank of claim 2 further characterized by air supply means operatively connected between a source of air and the expanding part of said connection means.

4. The waste treatment tank of claim 3 wherein said air supply means includes means for adjusting the supply of air to the expanding part of said connection means, said adjustment means comprising means for blocking the open end of said air supply means.

5. The waste treatment tank of claim 4 wherein said air supply means comprises a plurality of air tubes having the first end operatively connected to a source of air and a second end opening in said expanding part of said connection means so tht passage of the liquid through said expanding part induces a differential pressure between the ends of said air supply means.

6. A self-contained waste treatment tank for processing sewage, which comprises:
   a cylindrical tank having a bottom wall, a cylindrical side wall, and a top wall, said top, bottom and side walls defining a chamber therebetween, said chamber containing a predetermined liquid level therein;
   a cylindrical baffle mounted in said chamber, said baffle being concentrically arranged with said side wall and dividing said chamber into a first chamber part and a second chamber part, said cylindrical baffle having a lower end attached along the bottom wall of said tank and an upper end extending above the sewage level in said tank, said cylindrical baffle having a pluraity of openings formed in it for permitting communication between said first and said second chamber parts, said openings being formed in said baffle along the lower end of said baffle by displacing a portion of the material forming said baffle, the material so displaced defining protective means, said protective means permitting communication between said second chamber part and said first chamber part, thereby permitting the recirculation of sludge from said second chamber part to said first chamber part;

sewage inlet means communicating with said first chamber part;

inlet means in said cylindrical baffle communicating between said first chamber part and said second chamber part, said inlet means being positioned below the liquid level in said chamber;

means for generating a horizontal circulatory flow pattern in said first chamber part, said flow generating means comprising a submersible pump having an inlet positioned toward the bottom of said first chamber part and an outlet, and linkage means operatively connected to the outlet side of said pump, said linkage means comprising first and second pipe sections having substantially different internal diameters, and connection means between said first and said second pipe sections including an expansion part for increasing the size of said linkage from said first diameter to said second diameter, said first pipe section being attached to the outlet of said pump, said second pipe having an outlet in and below the fluid level in said first chamber part, said horizontal circulatory flow pattern generating means creating a flow pattern in said first chamber part which directs fluid from said first chamber part to said second chamber part through said inlet means and which simultaneously draws fluid from said second chamber part to said first chamber part along the opening in the lower end of said cylindrical baffle; and air supply means including at least one tubular member operatively connected between a source of air and the expanding part of said connection means so that passage of fluid through said expansion part induces a differential pressure between the ends of said tubular member.

7. A self-contained waste treatment tank, which comprises:

a cylindrical outer shell, said shell having a bottom wall, a cylindrical side wall, and a top wall, said outer shell delimiting a chamber;

a baffle mounted in said chamber, said baffle dividing said chamber into a first chamber part and a second chamber part, said first and said second chamber parts being arranged concentrically with respect to one another, said baffle having a lower end attached along the bottom wall of said outer shell, and an upper end extending above a liquid level in said chamber, said baffle having at least one opening permitting communication between said first and said second chamber parts along the lower end of said baffle so that the flow pattern in said first chamber part draws solid particles from said second chamber part into said first chamber part;

sewage inlet means communicating with said first chamber part;

inlet means in said baffle communicating between said first chamber part and said second chamber part, said inlet means being position below the liquid level in said chamber;

outlet means communicating with said second chamber part and a point external of said outer shell; and means for generating a horizontal circulatory flow pattern in said first chamber part, said flow pattern generating means comprising a pump submersed in said first chamber part, said pump having an inlet and an outlet, said inlet being positioned toward the bottom of said first chamber part, and linkage means connected to the outlet of said pump, said linkage means including a first pipe operatively connected to the outlet of said pump, connection means connected to a second end of said first pipe, and a second pipe having a first end operatively connected to said connection means and an open second end positioned below the liquid level in said first chamber part, said horizontal circulatory flow pattern generating means creating a flow pattern in said first chamber part which directs fluid from said first chamber part to said second chamber part through said inlet means and which simultaneously draws fluid from said second chamber part to said first chamber part along the opening in the lower end of said cylindrical baffle.

* * * * *

UNITED STATES PATENT AND TRADEMARK OFFICE
CERTIFICATE OF CORRECTION

PATENT NO. : 4,231,874
DATED : November 4, 1980
INVENTOR(S) : Raymond W. Heiligtag It is certified that error appears in the above-identified patent and that said Letters Patent are hereby corrected as shown below:

Column 2, line 34, "oulet" should read "outlet".
Column 5, line 49, "Unites" should read "United".
Column 5, line 53, "wall a cylindrical" should read "wall, a cylindrical".
Column 6, line 8, "sad" should read "said".
Column 6, line 57 "tht" should read "that".

Signed and Sealed this

Twenty-third Day of June 1981

[SEAL]

Attest:

RENE D. TEGTMEYER

Attesting Officer    Acting Commissioner of Patents and Trademarks